United States Patent
Hong et al.

(10) Patent No.: US 11,087,520 B2
(45) Date of Patent: Aug. 10, 2021

(54) AVATAR FACIAL EXPRESSION GENERATING SYSTEM AND METHOD OF AVATAR FACIAL EXPRESSION GENERATION FOR FACIAL MODEL

(71) Applicant: XRSPACE CO., LTD., Taoyuan (TW)

(72) Inventors: Wei-Zhe Hong, Miaoli County (TW); Ming-Yang Kung, Taipei (TW); Ting-Chieh Lin, New Taipei (TW); Feng-Seng Chu, New Taipei (TW)

(73) Assignee: XRSPACE CO., LTD., Taoyuan (TW)

( * ) Notice: Subject to any disclaimer, the term of this patent is extended or adjusted under 35 U.S.C. 154(b) by 0 days.

(21) Appl. No.: 16/655,250

(22) Filed: Oct. 17, 2019

(65) Prior Publication Data

US 2020/0090394 A1 Mar. 19, 2020

Related U.S. Application Data

(63) Continuation-in-part of application No. 16/136,241, filed on Sep. 19, 2018, now abandoned.

(51) Int. Cl.
*G06T 13/40* (2011.01)
*G06T 17/00* (2006.01)
(Continued)

(52) U.S. Cl.
CPC .............. *G06T 13/40* (2013.01); *G06F 3/011* (2013.01); *G06F 3/017* (2013.01); *G06F 3/16* (2013.01); *G06F 17/18* (2013.01); *G06T 17/00* (2013.01)

(58) Field of Classification Search
CPC combination set(s) only.
See application file for complete search history.

(56) References Cited

U.S. PATENT DOCUMENTS 8,207,971 B1 * 6/2012 Koperwas ............... G06T 13/40
345/473
8,797,331 B2 * 8/2014 Sano ...................... A61B 5/165
345/474
(Continued)

FOREIGN PATENT DOCUMENTS

CN 106485774 3/2017
CN 108961431 12/2018
(Continued)

OTHER PUBLICATIONS

"Search Report of Europe Counterpart Application", dated May 29, 2020, p. 1-p. 10.
(Continued)

*Primary Examiner* — Andrew G Yang
(74) *Attorney, Agent, or Firm* — JCIP Global Inc.

(57) ABSTRACT

An avatar facial expression generating system and a method of avatar facial expression generation are provided. In the method, user data relating to sensing result of a user is obtained. A first and a second emotional configurations are determined. The first and second emotional configuration maintain during a first and a second duration, respectively. A transition emotional configuration is determined based on the first emotional configuration and the second emotional configuration, in which the transition emotional configuration maintains during a third duration. Facial expressions of an avatar are generated based on the first emotional configuration, the transition emotional configuration, and the second emotional configuration, respectively. The third duration exists between the first duration and the second duration. Accordingly, a normal facial expression on an avatar would be presented while encountering the emotion transformation.

18 Claims, 6 Drawing Sheets

(51) Int. Cl.
  *G06F 17/18*  (2006.01)
  *G06F 3/01*   (2006.01)
  *G06F 3/16*   (2006.01)

(56) References Cited

U.S. PATENT DOCUMENTS

| | | | |
|---|---|---|---|
| 2005/0190188 A1 | 9/2005 | Anzawa et al. | |
| 2007/0153005 A1* | 7/2007 | Asai | G06T 13/40 345/473 |
| 2009/0066700 A1* | 3/2009 | Harding | G06T 7/251 345/473 |
| 2011/0141258 A1 | 6/2011 | Song et al. | |
| 2011/0296324 A1 | 12/2011 | Goossens et al. | |
| 2012/0139830 A1 | 6/2012 | Hwang et al. | |
| 2012/0223952 A1* | 9/2012 | Kanemaru | G06T 13/40 345/473 |
| 2014/0218371 A1* | 8/2014 | Du | G06T 13/80 345/473 |
| 2016/0307028 A1* | 10/2016 | Fedorov | G06F 16/11 |
| 2017/0242488 A1 | 8/2017 | Levesque et al. | |
| 2017/0311863 A1* | 11/2017 | Matsunaga | A61B 5/163 |
| 2018/0025506 A1 | 1/2018 | Li et al. | |
| 2019/0108668 A1 | 4/2019 | Shenton et al. | |
| 2019/0138096 A1 | 5/2019 | Lee et al. | |
| 2019/0171869 A1* | 6/2019 | Fortune | G06K 9/00315 |
| 2020/0004948 A1* | 1/2020 | Zhu | G06F 3/011 |
| 2020/0302668 A1* | 9/2020 | Guo | G06K 9/00315 |

FOREIGN PATENT DOCUMENTS

| | | |
|---|---|---|
| JP | 2962549 | 10/1999 |
| JP | 2002304638 | 10/2002 |
| JP | 2009153692 | 7/2009 |
| JP | 2018124666 | 8/2018 |
| TW | I395201 | 5/2013 |
| TW | 201434600 | 9/2014 |
| TW | I596506 | 8/2017 |
| TW | I625680 | 6/2018 |
| TW | I642306 | 11/2018 |
| WO | 2018128996 | 7/2018 |

OTHER PUBLICATIONS

"Office Action of Taiwan Counterpart Application", dated Sep. 22, 2020, p. 1-p. 7.

Muharram Mansoorizadeh, et al., "Hybrid Feature and Decision Level Fusion of Face and Speech Information for Bimodal Emotion Recognition." Proceedings of the 14th International CSI Computer Conference, Oct. 20, 2009, pp. 652-657.

"Search Report of Europe Related Application, application No. 20187067.2-1207", dated Dec. 21, 2020, p. 1-p. 6.

"Office Action of Japan Counterpart Application", dated Jan. 19, 2021, p. 1-p. 5.

* cited by examiner

AVATAR FACIAL EXPRESSION GENERATING SYSTEM AND METHOD OF AVATAR FACIAL EXPRESSION GENERATION FOR FACIAL MODEL

CROSS-REFERENCE TO RELATED APPLICATION

This application is a continuation-in-part application of and claims the priority benefit of U.S. application Ser. No. 16/136,241, filed on Sep. 19, 2018, now pending. The entirety of the above-mentioned patent application is hereby incorporated by reference herein and made a part of this specification.

BACKGROUND OF THE DISCLOSURE

1. Field of the Disclosure

The present disclosure generally relates to a method for generating a facial expression, in particular, to an avatar facial expression generating system and a method of avatar facial expression generation of a facial model.

2. Description of Related Art

Technologies for simulating senses, perception and/or environment, such as virtual reality (VR), augmented reality (AR), mixed reality (MR) and extended reality (XR), are popular nowadays. The aforementioned technologies can be applied in multiple fields, such as gaming, military training, healthcare, remote working, etc.

In order to let the user perceive the simulated environment as a real environment, motion of the body portions or facial expression in the real world would be tracked, so that the displaying image and the motion or the facial expression of an avatar on a VR, AR, MR or XR display can be changed in response to the motion or the facial expression of the user.

Regarding facial expression simulation, in conventional approach, a camera is disposed to capture the face of a user with a head-mounted display (HMD), and the simulated facial expression would be generated according to the facial features in the captured image. However, a part of the face is covered by the HMD, so that it is hard to identify facial features and facial expressions.

In addition, there are multiple facial expressions of human, and there may be a significant difference between two facial expressions with different emotions. In conventional approach, the facial expression of an avatar may be forced to be switched from one emotion to another emotion in response to a change of emotions. Eventually, an abnormal facial expression may be presented on the avatar. Therefore, there are still lots of technical problems that should be improved for facial expression simulation of avatar.

SUMMARY OF THE DISCLOSURE

Accordingly, the present disclosure is directed to an avatar facial expression generating system and a method of avatar facial expression generation, in which a transition is provided between two facial expressions based on different emotions.

In one of the exemplary embodiments, a method of avatar facial expression generation of a facial model includes, but not limited to, the following steps. User data is obtained, where the user data is related to a sensing result of a user. A first emotional configuration and a second emotional configuration are determined based on the user data. The first emotional configuration maintains during a first duration, and the second emotional configuration maintains during a second duration different from the first duration. A transition emotional configuration is determined based on the first emotional configuration and the second emotional configuration. The transition emotional configuration maintains during a third duration different from the first duration. Facial expressions of an avatar are generated based on the first emotional configuration, the transition emotional configuration, and the second emotional configuration, respectively. The third duration exists between the first duration and the second duration.

In one of the exemplary embodiments, a facial expression generating system includes, but not limited to, an input apparatus, a memory, and a processor. The input apparatus is used for obtaining user data, where the user data is related to the sensing result of a user. The memory is used for storing a program code. The processor is coupled to the memory and loads the program code to perform the following steps. The processor determines a first emotional configuration and a second emotional configuration based on the user data, determines a transition emotional configuration based on the first emotional configuration and the second emotional configuration, and generates facial expressions of an avatar based on the first emotional configuration, the transition emotional configuration, and the second emotional configuration, respectively. The first emotional configuration maintains during a first duration, and the second emotional configuration maintains during a second duration different from the first duration. The transition emotional configuration maintains during a third duration different from the first duration. The third duration exists between the first duration and the second duration.

It should be understood, however, that this Summary may not contain all of the aspects and embodiments of the present disclosure, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
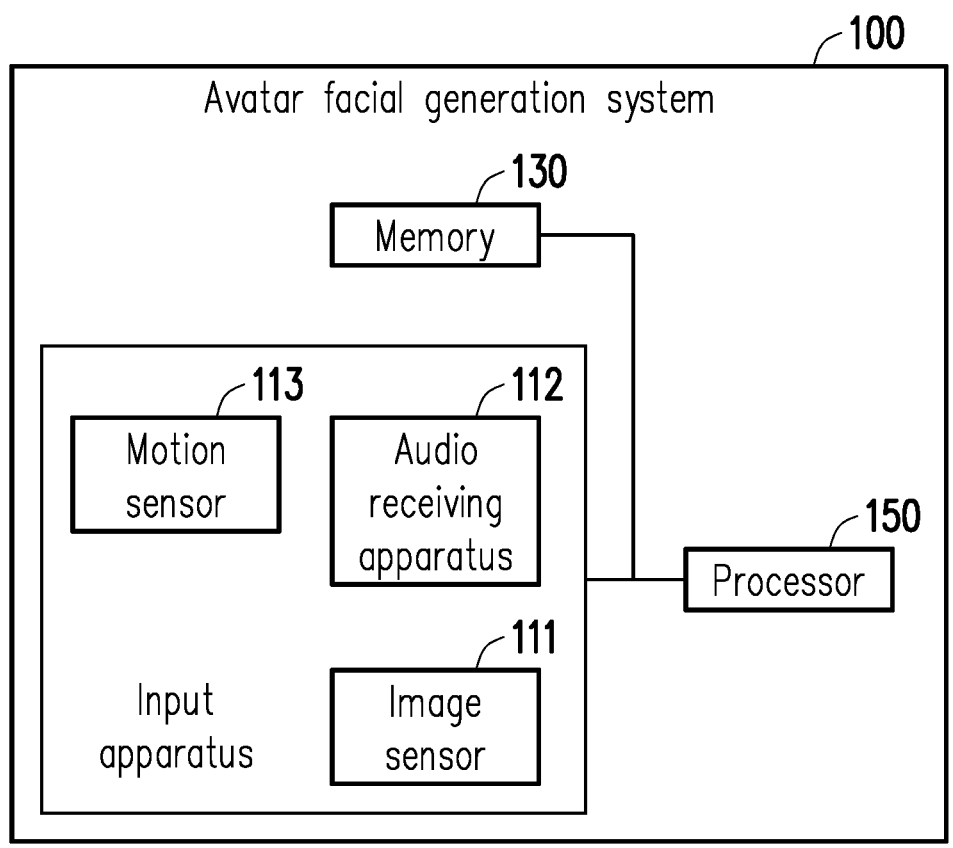
FIG. 1 is a block diagram illustrating an avatar facial expression generating system according to one of the exemplary embodiments of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a block diagram illustrating an avatar facial expression generating system 100 according to one of the exemplary embodiments of the disclosure. Referring to FIG. 1, the avatar facial expression generating system 100 includes, but not limited to, an input apparatus 110, a memory 130 and a processor 150. The avatar facial expression generating system 100 is adapted for VR, AR, MR, XR or other reality related technology.

The input apparatus 110 is used for obtaining user data. The user data is related to sensing result of a user. The sensing result may be related to the voice, the motion and/or facial expression of the user.

In one embodiment, the input apparatus 110 includes an image sensor 111. The image sensor 111 may be a camera, such as a monochrome camera or a color camera, a deep camera, a video recorder, or other sensor capable of capturing images.

In some embodiments, the image sensor 111 may be used to capture toward one or more human body portions of the user, to generate an image including the human body portion of the user. For example, the human body portions may include a face, a hand, a head, an ankle, a leg or a waist of the user.

In some embodiments, the image sensor 111 may be used to capture toward the face of a user, to generate a facial image including one or both eye, one or both ear, a nose, a mouse, a face shape, a hair shape, an eyebrow, a bread or a combination thereof of the user.

In one embodiment, the input apparatus 110 includes an audio receiving apparatus 112. The audio receiving apparatus 112 may include, but not limited to, a microphone, an analog-to-digital converter, a filter, and an audio processor. The microphone of the audio receiving apparatus 112 may receive sound waves (e.g., generated by human voice, ambient sounds, etc.) and converting them into sound data. In some embodiments, the audio receiving apparatus 112 is used to receive the voice of a user and generate voice data. In some embodiments, the avatar facial expression generating system 100 may not have the audio receiving apparatus 112.

In one embodiment, the input apparatus 110 includes a motion sensor 113. The motion sensor 113 may be an accelerometer, a gyroscope, a magnetometer, a laser sensor, an inertial measurement unit (IMU), an infrared ray (IR) sensor, or any combination of aforementioned sensors. In the embodiment of the disclosure, the motion sensor 113 is used for sensing the motion of one or more human body portions of the user, to generate a sequence of motion sensing data from the sensing result of the sensor 110 (e.g. sensed strength values, etc.) at several timepoints. For one example, the motion sensing data comprises a 3-degree of freedom (3-DoF) data, and the 3-DoF data is related to the rotation data of the human body portion in a three-dimensional (3D) space, such as accelerations in yaw, roll and, pitch. For another example, the motion sensing data comprises a relative position and/or displacement of a human body portion in the 2D/3D space.

The memory 130 may be any type of a fixed or movable Random-Access Memory (RAM), a Read-Only Memory (ROM), a flash memory, a similar device or a combination of the above devices. The memory 130 records program codes, device configurations, buffer data or permanent data (such as image data, voice data, motion sensing data, emotional configurations, transition emotional configuration, weighted relation, linear relation, emotion categories, etc.), and these data would be introduced later.

The processor 150 is coupled to the input apparatus 110 and the memory 130, and the processor 150 is configured to load the program codes stored in the memory 130, to perform a procedure of the exemplary embodiment of the disclosure.

In some embodiments, functions of the processor 150 may be implemented by using a programmable unit such as a central processing unit (CPU), a microprocessor, a microcontroller, a digital signal processing (DSP) chip, a field programmable gate array (FPGA), etc. The functions of the processor 150 may also be implemented by an independent electronic device or an integrated circuit (IC), and operations of the processor 150 may also be implemented by software.

It should be noticed that, the processor 150 may not be disposed at the same apparatus with the input apparatus 110. However, the apparatuses respectively equipped with input apparatus 110 and the processor 150 may further include communication transceivers with compatible communication technology, such as Bluetooth, Wi-Fi, infrared ray (IR), or physical transmission line, to transmit or receive data with each other. For example, the audio receiving apparatus 112 and the processor 150 may be disposed in a head-mounted display (HMD) while the image sensor 111 being disposed outside the HMD. For another example, the processor 150 may be disposed in a server while the image sensor 111 and the audio receiving apparatus 112 being disposed outside the server.

To better understand the operating process provided in one or more embodiments of the disclosure, several embodiments will be exemplified below to elaborate the operating process of the avatar facial expression generating system 100. The devices and modules in the avatar facial expression generating system 100 are applied in the following embodiments to explain the method of avatar facial expression generation provided herein. Each step of the method can be adjusted according to actual implementation situations and should not be limited to what is described herein.

Figure 2:
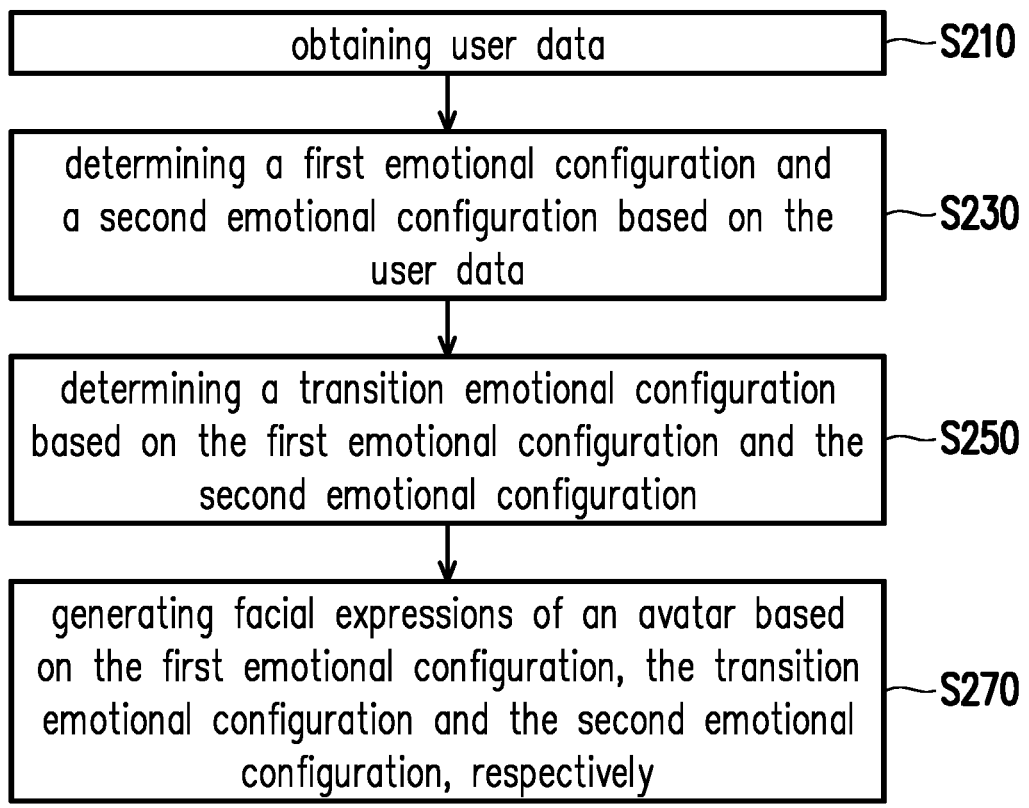
FIG. 2 is a flowchart illustrating a method of avatar facial expression generation of a facial model according to one of the exemplary embodiments of the disclosure.

FIG. 2 is a flowchart illustrating a method of avatar facial expression generation according to one of the exemplary embodiments of the disclosure. Referring to FIG. 2, the processor 150 obtains user data through the input apparatus 110 (step S210). The user data could be voice data, motion sensing data, or image data respectively obtained from the audio receiving apparatus 112, the motion sensor 113 and the image sensor 111. Alternatively, the user data could be a combination of voice data, motion sensing data, and image data.

The processor 150 may determine a first emotional configuration and a second emotional configuration based on the user data (step S230). Specifically, there are multiple emotions for humans. Different emotions may be corresponding to different facial expressions. Each emotional configuration is used to generate or modify features of facial expression on an avatar, and each emotional configuration is corresponding to specific geometry parameters and/or texture parameters.

In one embodiment, the avatar facial expression generating system 100 provides multiple emotion categories (such as happiness, sadness, fear, disgust anger, surprise, excitement, etc.), and each emotion category includes one or more levels. Different levels of one emotion category represent the different strengths of the corresponding emotion. For example, a happiness emotion includes 3 levels, in which the first level represents the least strength and the third level represents the most strength of happiness emotion. In addition, each emotional configuration corresponds to one or more levels of one or more emotion categories. For example, the first emotional configuration is 40% of the second level of happiness emotion and 60% of the first level of sadness emotion. However, in some embodiments, one emotion category may merely include one level, and each emotional configuration corresponds to one or more emotion categories. For example, the second emotional configuration is 50% of happiness emotion and 50% of sadness emotion.

In one embodiment, the processor 150 may determine whether an input event of the input apparatus 110 is met anyone of predefined triggering conditions. Each of the predefined triggering conditions may be corresponding to an emotional configuration of the avatar. When an input event is met one of the predefined triggering conditions, the emotional configuration of the avatar may have to be updated in response to the input event. The input event may be encountering a specific scenario, a specific motion of the user being detected, a specific input data (such as voice data, image data, motion sensing data, text data, input operation of a user, etc.) being received, etc. For example, the reception of the voice data by the audio receiving apparatus 112 could be an input event. For another example, the detection of the motion sensing data by the motion sensor 113 could be another input event.

Depending on different design requirements, there are many triggering conditions. The triggering condition is a condition to determine that one or more specific emotion of a user. The processor 150 may analyze the intent of a user to determine its emotion(s). In one embodiment, a triggering condition is voice data generated by the audio receiving apparatus 112 includes a key word or a key phrase. The processor 150 may identify words in the voice data and perform a semantic analysis on the identified word. During the semantic analysis, the processor 150 may determine whether the identified words in the voice data are matched with a specific key word or a specific key phrase, to determining whether the specific key word or the specific key phrase is detected in the voice data. The processor 150 may predefine multiple key words and/or key phrases, and each predefined key word or predefined key phrase is corresponding to a specific emotional configuration (i.e., a specific emotion or a specific level of one emotion). For example, voice data is related to a sentence "I am very happy", and the key words "very happy" is corresponding to the fifth level of happiness emotion. If the identified words are matched with one predefined key word or one predefined key phrase (i.e., the predefined key word or phrase is detected), the processor 150 determines that the triggering condition is met, and the processor 150 determine a corresponding emotional configuration. Otherwise, the processor 150 determines that the triggering condition is not met.

In some embodiments, the processor 150 may use the machine learning technology (such as artificial neural network, decision tree, support vector machines (SVM), etc.) for semantic analysis, and the processor 150 may use an emotion classifier trained by the machine learning technology to determine which emotion or level of emotion is corresponding to the voice data.

In another embodiment, the triggering condition may be a specific motion or facial expression of the user being detected. The processor 150 may analyze the image data obtained by the image sensor 111 and/or the motion sensing data obtained by the motion sensor 113. Also, the processor 150 may determine whether a predefined motion or a predefined facial expression in the image is detected. For example, if the processor 150 detected that corners of the mouth in image data obtained by the image sensor 111 are raised, the processor 150 may consider a happiness emotion is detected. For another example, if the processor 150 detected that a user rises up his two hands in motion sensing data obtained by the motion sensor 113, the processor 150 may consider a happiness emotion is detected.

It should be noticed that, in some conventional approaches, in response to a change of emotions being detected, a corresponding facial expression of a subsequent emotion may be presented on the avatar directly. However, there may be a large difference between geometry parameters and texture parameters of the facial features of two emotions. An abnormal facial expression may be presented when forcing one emotion to be switched to another emotion. Further, in other conventional approaches, facial expressions of the avatar are decided without considering the emotion(s) of the user.

Figure 3:
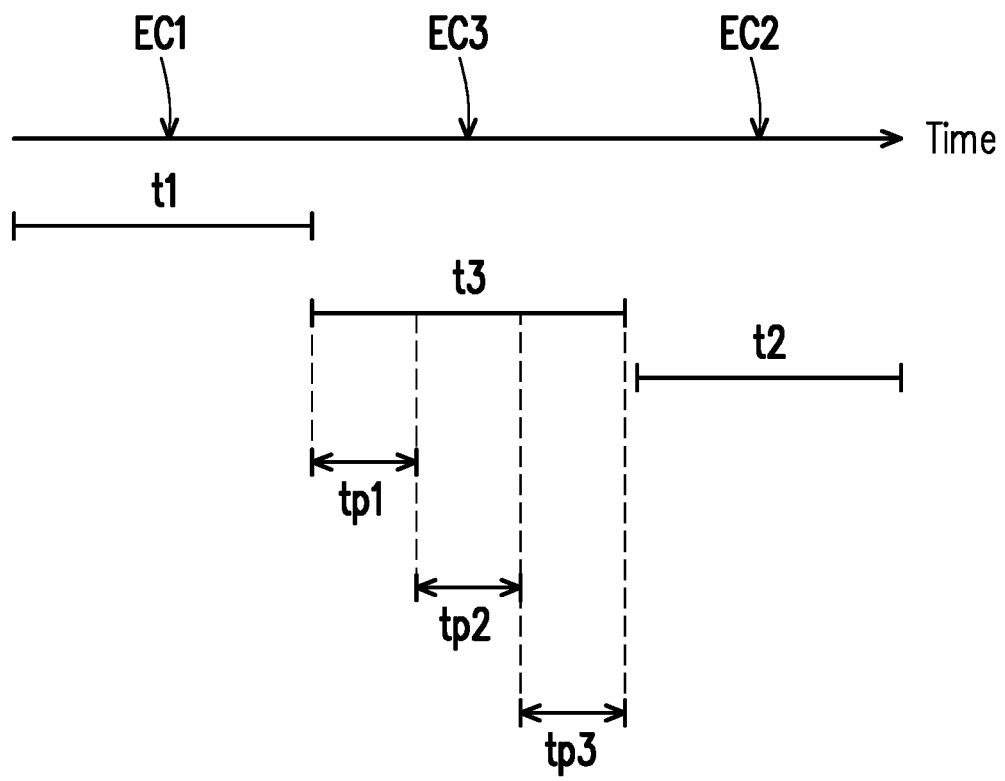
FIG. 3 is a timing diagram illustrating multiple emotional configurations according to one of the exemplary embodiments of the disclosure.

In the embodiment of present disclosure, if an emotion transformation is detected (i.e., a triggering condition of a second emotional configuration is met), the processor 150 may determine a transition emotional configuration based on the first emotional configuration and the second emotional configuration (step S250). It means that, a transition would be inserted between two emotional configurations. FIG. 3 is a timing diagram illustrating multiple emotional configurations according to one of the exemplary embodiments of the disclosure. Referring to FIG. 3, in one embodiment, the first emotional configuration EC1 maintains during a first duration t1, and the second emotional configuration EC2 maintains during a second duration t2 different from the first duration t1. In addition, the transition emotional configuration EC3 maintains during a third duration t3 different from the first duration t1 and existed between the first and the second durations t1, t2. It means, after the third duration t3 for applying the transition emotional configuration EC3 expired, then the second emotional configuration EC2 can be applied.

The transition emotional configuration EC3 is used to generate the facial expression of the avatar. One or more geometry parameters and/or texture parameters of the facial model may be generated or modified according to the transition emotional configuration EC3.

In one embodiment, the processor 150 may combine the first and second emotional configurations, to generate one or more emotional combinations. The way to combine two emotional configurations may be to determine a summation or a weighting average of parameters of two emotional configurations, or directly use part of parameters from the parameters of two emotional configurations as parameters of one emotional configuration.

In one embodiment, an emotional configuration is corresponding to only and specific one facial expression, and in the period of the third duration, the processor 150 may adjust the facial expression of the avatar by averaging the geometry parameters and/or texture parameters corresponding to the first and second emotional configurations or giving a weighted relation on the parameters of the two emotional configurations, and the average result or weight calculating result would become one emotional combination. For example, the processor 150 may determine a central point between two nose positions of the two emotional configurations, and the central point would be one parameter of an emotional combination. For another example, the weight of the first emotional configuration is 0.8 and the weight of the second emotional configuration is 0.2, and the processor 150 performs a weighted calculation on lips positions of the two emotional configurations according to the aforementioned weights. Then, the processor 150 determines each emotional combination as one transition emotional configuration.

In another embodiment, the processor 150 divides the third duration into multiple time periods, and determines the weighted relation according to a linear relation of the first and second emotional configurations. Taking FIG. 3 as an example, the third duration t3 is divided into three time periods tp1, tp2, and tp3. However, the number of the time periods may vary in another embodiment. The linear relation is a relation between the level/ratio of one emotional configuration and time. For example, a mathematical form of a linear relation is $L1=3-(3/2)*tsi$, where L1 is the level of the first emotional configuration at the i-th time section and tsi is the value of the i-th time section. The higher the i is, the higher the value of the i-th time section is. The weighted relation includes a first weight of the first emotional configuration and a second weight of the second emotional configuration. Based on the linear relation, the first weight at different time sections decreases along with time and the second weight at different time sections increases along with time. For example, a mathematical form of a linear relation of the first emotional configuration is $L1=2-(2/4)*tsj$, and another mathematical form of a linear relation of the second emotional configuration is $L2=4-(4/5)*tsj$, where L2 is the level of the second emotional configuration at the j-th time section and tsj is the value of the j-th time section. The higher the j is, the higher the value of the j-th time section is. The first and second weights are determined according to the level/ratio determined from the linear relation. For example, $L1/(L1+L2)$ could be the first weight, and $L2/(L1+L2)$ could be the second weight.

Figure 4:
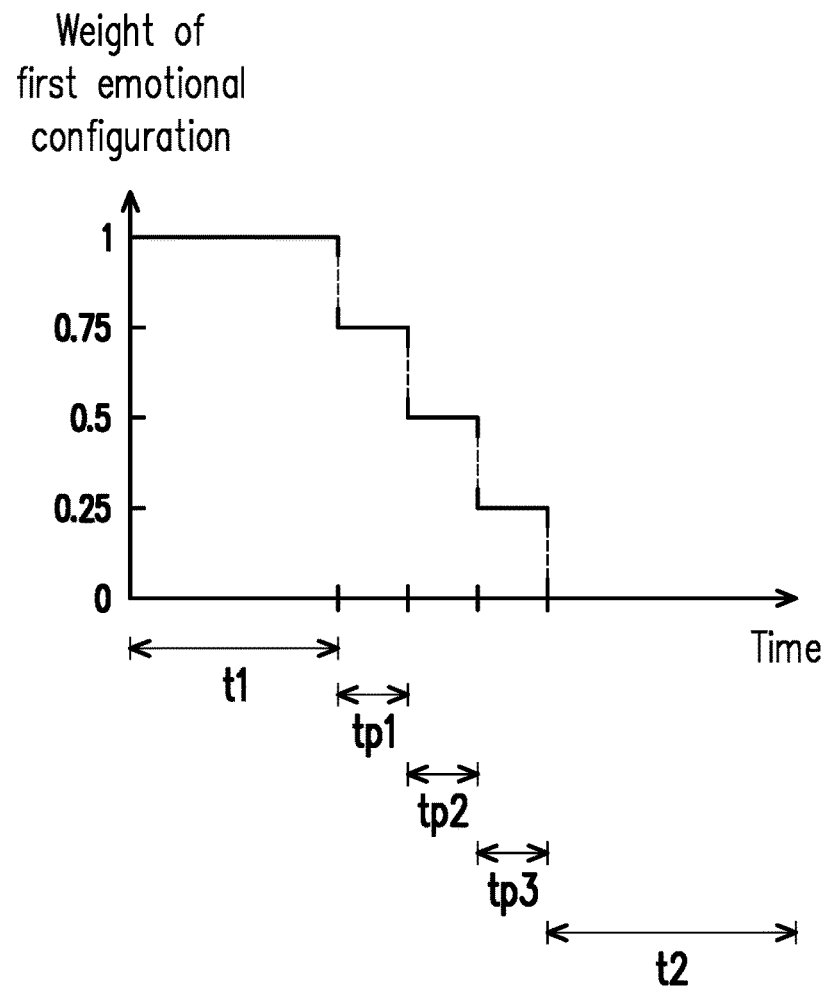
FIG. 4 is a schematic diagram illustrating a change of two emotions according to one of the exemplary embodiments of the disclosure.
Figure 4:
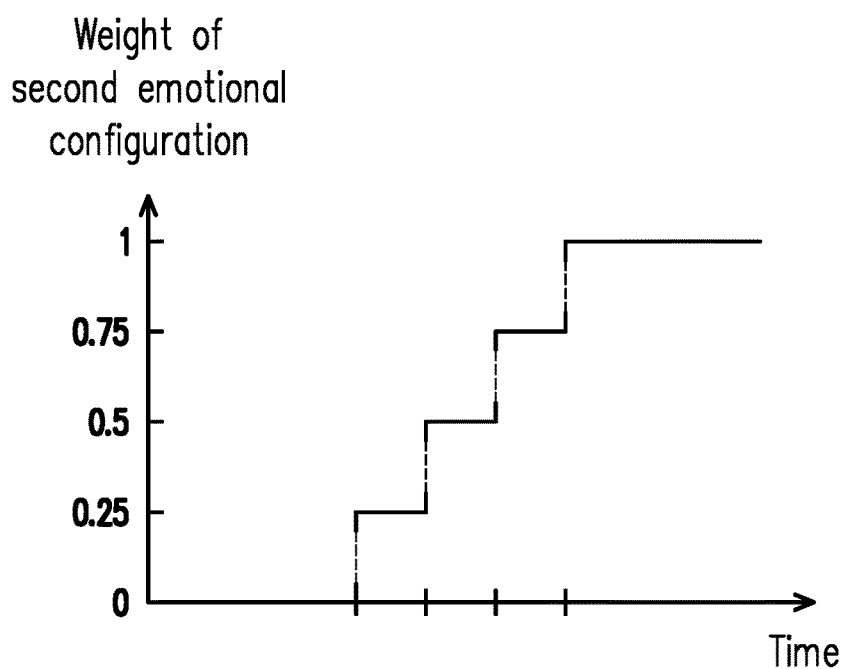

FIG. 4 is a schematic diagram illustrating a change of two emotions according to one of the exemplary embodiments of the disclosure. Referring to FIG. 4, there are two weight-time diagrams for the first and second emotional configuration, respectively. At the end of the first duration t1, a predefined key word corresponding to the second emotional configuration is detected. Because of the linear relation, the weight of the first emotional configuration may decrease linearly at different time sections tp1, tp2, and tp3, and the weight of the second weight emotional configuration may increase linearly at different time sections tp1, tp2, and tp3. Then, the first and second weights are determined according to the diagrams.

It one embodiment, multiple emotional combinations would be determined, and the processor 150 may generate the facial expression according to each emotional combination in order. The third duration for applying the transition emotional configuration would be divided into multiple time sections. The processor 150 may apply different emotional combinations in different time sections. The order of multiple emotional combinations is related to the weighted relation of the two emotional configurations. Regarding the first emotional configuration, the lager value of the first weight would be applied first. Regarding the second emotional configuration, the smaller value of the second weight would be applied first.

Taking FIG. 4 as an example, the third duration for applying the transition emotional configuration is the duration between the first duration t1 and the second duration t2. There are three emotional combinations at three time periods tp1, tp2 and tp3. The first emotional combination, which is applied in the time section tp1, is related that the first weight is 0.75 and the second weight is 0.25. The second emotional combination, which is applied in the time section tp2, is related that the first weight is 0.5 and the second weight is 0.5. The third emotional combination, which is applied in the time section tp3, is related that the first weight is 0.25 and the second weight is 0.75. It should be noted that the weight of the first emotional configuration remains the same during the first duration t1. For example, the first emotional configuration is fixed at 60% of happiness emotion and 40% of surprise emotion. Similarly, the weight of the second emotional configuration remains the same during the second duration t2.

Figure 5:
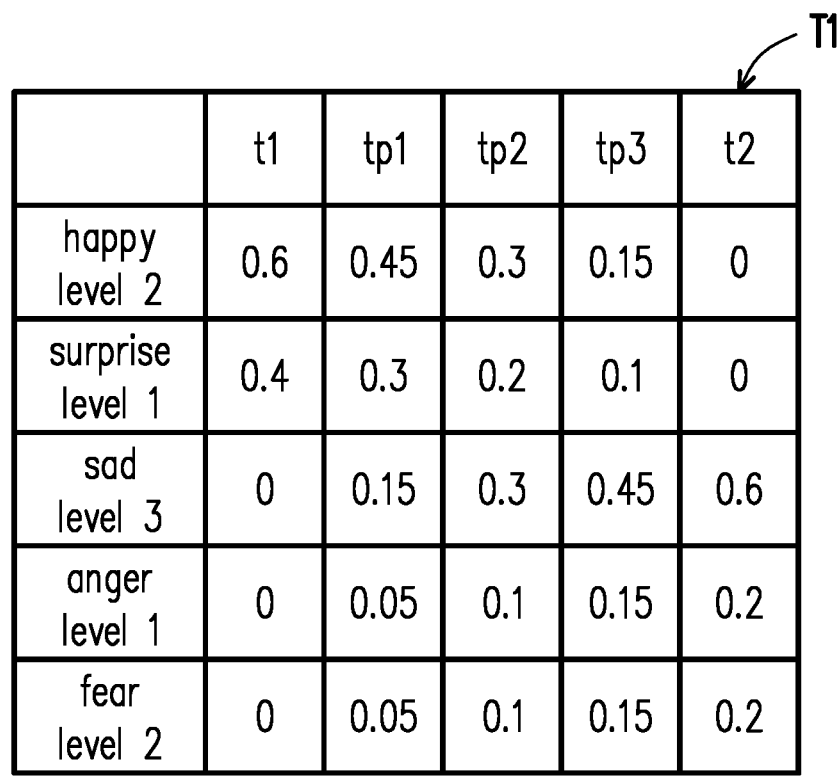
FIG. 5 is a table illustrating parameters of multiple emotional configurations according to one of the exemplary embodiments of the disclosure.

FIG. 5 is a table T1 illustrating parameters of multiple emotional configurations according to one of the exemplary embodiments of the disclosure. Referring to FIGS. 4 and 5, it is assumed that the first emotional configuration is 60% of the second level of happiness emotion and 40% of the first level of surprise emotion. In addition, the second emotional configuration is 60% of the third level of sadness emotion, 20% of the first level of anger emotion, and 20% of the second level of fear emotion. During the time section tp1, the transition emotional configuration is 75% of the first emotional configuration and 25% of the second emotional configuration, and that is 45% of the second level of happiness emotion, 30% of the first level of surprise emotion, 15% of the second level of sadness emotion, 5% of the second level of anger emotion, and 5% of the first level of fear emotion. During the time section tp2, the transition emotional configuration is 50% of the first emotional configuration and 50% of the second emotional configuration, and that is 30% of the second level of happiness emotion, 20% of the first level of surprise emotion, 30% of the second level of sadness emotion, 10% of the second level of anger emotion, and 10% of the first level of fear emotion. During the time section tp3, the transition emotional configuration is 25% of the first emotional configuration and 75% of the second emotional configuration, and that is 15% of the second level of happiness emotion, 10% of the first level of surprise emotion, 45% of the second level of sadness emotion, 15% of the second level of anger emotion, and 15% of the first level of fear emotion.

Figure 6:
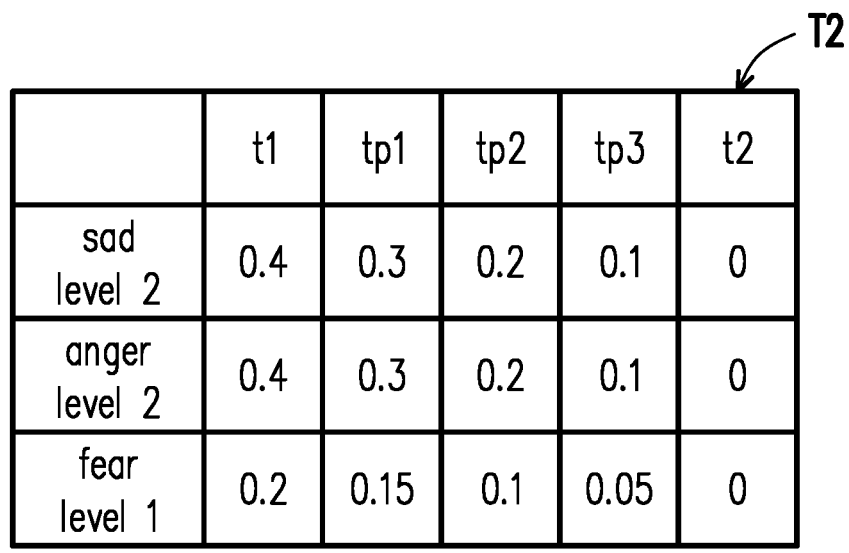
FIG. 6 is another table illustrating parameters of multiple emotional configurations according to one of the exemplary embodiments of the disclosure.

FIG. 6 is another table T2 illustrating parameters of multiple emotional configurations according to one of the exemplary embodiments of the disclosure. Referring to FIGS. 4 and 6, it is assumed that the first emotional configuration is 40% of the second level of sadness emotion, 40% of the second level of anger emotion, and 20% of the first level of fear emotion. In addition, the second emotional configuration is 0% of all emotions, for example, fading out. During the time section tp1, the transition emotional configuration is 75% of the first emotional configuration and 25% of the second emotional configuration, and that is 30% of the second level of sadness emotion, 30% of the second level of anger emotion, and 15% of the first level of fear emotion. During the time section tp2, the transition emotional configuration is 50% of the first emotional configuration and 50% of the second emotional configuration, and that is 20% of the second level of sadness emotion, 20% of the second level of anger emotion, and 10% of the first level of fear emotion. During the time section tp3, the transition emotional configuration is 25% of the first emotional configuration and 75% of the second emotional configuration, and that is 10% of the second level of sadness emotion, 10% of the second level of anger emotion, and 5% of the first level of fear emotion.

It should be noticed that, the length of the third duration for applying the transition emotional configuration may be fixed or variable. In one embodiment, the processor 150 determines the length of the third duration for applying the transition emotional configuration according to a difference between a first emotional value of the first emotional configuration and a second emotional value of the second emotional configuration. If each emotion category is defined with multiple levels, the processor 150 may determine a difference between the first level of the first emotion corresponding to the first emotional configuration and the second level of the second emotion corresponding to the second emotional configuration as the difference between the first emotional configuration and the second emotional configuration.

For example, the first emotional configuration is corresponding to the second level of sadness emotion, and the second emotional configuration is corresponding to the sixth level of fear emotion. The processor 150 may determine the difference between two emotional configurations is 8 levels. If a difference between two emotional configurations is more, the third duration of transition may be increased. If a difference between two emotional configurations is less, the third duration of transition may be decreased. For example, if the difference is 8 levels, the duration would be 1 second; if the difference is 2 levels, the duration would be 200 microseconds.

In another embodiment, the processor 150 may predefine the third durations between two specific emotions. For example, a duration of transition from sadness emotion to happiness emotion is 500 microseconds, and another duration of transition from fear emotion to happiness emotion is 1 second.

In still another embodiment, the processor 150 may obtain a character of a user, and determine the third duration for applying the transition emotional configuration according to the character of the user. The processor 150 determines the character of the user according to the star sign of the user. Alternatively, the processor 150 may analyze the behaviors or decisions made by the user in the virtual world, and the analyzed result can be used to determine the character of the user.

Referring back to FIG. 2, the processor 150 generates the facial expressions of an avatar based on the first emotional configuration, the transition emotional configuration, and the second emotional configuration (step S270). Specifically, the face of an avatar may include facial features (such as shapes or motions of face, eyes, nose, eyebrows, etc.). The facial expression of the avatar may include geometry parameters and texture parameters. Each geometry parameter is used to indicate a 2D or 3D coordinate of vertex of the face of the avatar. In some embodiments, each texture parameter is used to indicate a position of the face at which a facial image of corresponding emotional configuration is applied.

The processor 150 may generate, merge or replace the emotional configuration with the features of the facial expression, to generate the facial expression corresponding to a specific emotion. In one embodiment, the processor 150 may select one facial expression from a corresponding facial expression group for first emotional configuration, the transition emotional configuration or the second emotional configuration, respectively, according to a probability distribution (such as normal distribution, geometric distribution, Bernoulli distribution, etc.). Each expression group comprises multiple facial expressions. Each emotion or each level of one emotion is corresponding to a specific expression group. For example, there are 10 facial expressions for an emotional configuration, and the processor 150 may select one from the 10 facial expressions randomly.

In some embodiments, the processor 150 may generate facial features for each emotional configuration. Each emotional configuration may be configured with a specific limitation (such as length, angle, color, size, etc.) for parameters of the facial features, and a corresponding facial feature can be generated based on the limitation. For example, the length of the lip has a range when the emotional configuration has the happiness emotion and a weight of the happiness emotion is more than 0.1.

In some embodiments, each emotional configuration is corresponding to a facial template, and the facial template is corresponding to a specific image or a specific animation. The processor 150 may paste the facial template at a specific position of the facial model.

The processor 150 would generate the facial expressions based on the first emotional configuration, the transition emotional configuration, and the second emotional configuration, respectively and in order. The order could be, for example, based on the order of three durations as shown in FIG. 3.

In some embodiment, the processor 150 may generate the facial expressions in real-time in response to determining the first emotional configuration and the second emotional configuration. To achieve real-time, the fourth duration between the timepoint when one emotional configuration is detected and the timepoint when the facial expressions of the emotional configuration is generated on the avatar may be less than a threshold (such as 500 microseconds, 300 microseconds, or 1 second, etc.). However, in some embodiments, the fourth duration may be larger than the threshold (non-real time manner).

It should be noticed that, besides emotion simulation, lips on the avatar can be synchronized with the voice data. In some embodiments, the motion of lips on the avatar varies according to voice data generated by the audio receiving apparatus 112. If voice data is received, the processor 150 performs speech recognition on the voice data, and parses specific vowels and consonants in the voice data. These vowels and consonants are defined with specific lip shapes or lip animations. A corresponding lip shape or animation would be presented on the facial model in response to the predefined vowel or consonant being detected, so that the motion of lips on the avatar is synchronized with the voice data.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method of avatar facial expression generation, comprising:
 obtaining user data, wherein the user data is related to sensing result of a user;
 determining a first emotional configuration and a second emotional configuration based on the user data, wherein the first emotional configuration maintains during a first duration, and the second emotional configuration maintains during a second duration different from the first duration;

determining a transition emotional configuration based on the first emotional configuration and the second emotional configuration, wherein the transition emotional configuration maintains during a third duration different from the first duration, and determining the transition emotional configuration comprises:

combining the first and second emotional configurations, to generate at least one emotional combination, comprising:

dividing the third duration into a plurality of time periods; and determining a weighted calculation according to a linear relation of the first and second emotional configurations, wherein the at least one emotional combination is related to the weighted calculation, weights of the first and second emotional configurations in the weighted calculation are not zero, the weighted calculation comprises a first weight of the first emotional configuration and a second weight of the second emotional configurations, the first weight at different time periods decreases and the second weight at different time periods increases along with time based on the linear relation; and determining the at least one emotional combination as the transition emotional configuration; and generating facial expressions of an avatar based on the first emotional configuration, the transition emotional configuration, and the second emotional configuration, respectively, wherein the third duration exists between the first duration and the second duration.

2. The method of avatar facial expression generation according to claim 1, wherein the step of generating the transition emotional configuration comprises:

determining a length of the third duration according to a difference between a first emotional value of the first emotional configuration and a second emotional value of the second emotional configuration.

3. The method of avatar facial expression generation according to claim 2, further comprising:

providing a plurality of emotion categories, wherein each of the emotion categories comprises at least one level, the first and second emotional configurations correspond to a first level of a first emotion of the emotion categories, and the second emotional configuration corresponds to a second level of a second emotion of the emotion categories; and determining a difference between the first level of the first emotion and the second level of the second emotion as the difference between the first emotional configuration and the second emotional configuration.

4. The method of avatar facial expression generation according to claim 1, wherein the step of generating the transition emotional configuration comprises:

obtaining a character of a user, wherein the facial model is an avatar of the user; and determining the third duration according to the character of the user.

5. The method of avatar facial expression generation according to claim 1, wherein the user data is voice data, and the step of determining the first and second emotional configuration comprises:

determining whether a key word or a key phrase is detected in the voice data; and determining a triggering condition for the first or second emotional configuration is met in response to the key word or the key phrase being detected.

6. The method of avatar facial expression generation according to claim 1, wherein the user data is motion sensing data, and the step of determining the first and second configuration comprises:

determining whether a key motion is detected in the motion sensing data; and determining a triggering condition for the first or second emotional configuration is met in response to the key motion being detected.

7. The method of avatar facial expression generation according to claim 1, wherein the user data is image data, and the step of determining the first and second configuration comprises:

determining whether a key motion is detected in the image data; and determining a triggering condition is met in response to the key motion being detected.

8. The method of avatar facial expression generation according to claim 1, wherein the step of generating the facial expressions of the avatar comprises:

selecting one of the facial expressions from an expression group according to a probability distribution, wherein the expression group comprises a plurality of the facial expressions.

9. The method of avatar facial expression generation according to claim 1, wherein the step of generating the facial expressions of the avatar comprises:

generating the facial expressions in real-time in response to determining the first emotional configuration and the second emotional configuration.

10. An avatar facial expression generating system, comprises:

an input apparatus, obtaining user data, wherein the user data is related to sensing result of a user;

a memory, storing a program code; and a processor, coupled to the memory, and loading the program code to perform:

determining a first emotional configuration and a second emotional configuration based on the user data, wherein the first emotional configuration maintains during a first duration, and the second emotional configuration maintains during a second duration different from the first duration;

determining a transition emotional configuration based on the first emotional configuration and the second emotional configuration, wherein the transition emotional configuration maintains during a third duration different from the first duration, and determining the transition emotional configuration comprises:

combining the first and second emotional configurations, to generate at least one emotional combination, comprising:

dividing the third duration into a plurality of time periods; and determining a weighted calculation according to a linear relation of the first and second emotional configurations, wherein the at least one emotional combination is related to the weighted calculation, weights of the first and second emotional configurations are not zero in the weighted calculation, the weighted calculation comprises a first weight of the first emotional configuration and a second weight of the second emotional configuration, the first weight at different time periods decreases and the second weight at different time periods increases along with time based on the linear relation; and determining the at least one emotional combination as the transition emotional configuration; and generating facial expressions of an avatar based on the first emotional configuration, the transition emotional configuration, and the second emotional configuration, respectively, wherein the third duration exists between the first duration and the second duration.

11. The avatar facial expression generating system according to claim 10, wherein the processor further performs:

determining a length of the third duration according to a difference between a first emotional value of the first emotional configuration and a second emotional value of the second emotional configuration.

12. The avatar facial expression generating system according to claim 11, wherein the processor further performs:

providing a plurality of emotion categories, wherein each of the emotion categories comprises at least one level, the first and second emotional configurations correspond to a first level of a first emotion of the emotion categories, and the second emotional configuration corresponds to a second level of a second emotion of the emotion categories; and determining a difference between the first level of the first emotion and the second level of the second emotion as the difference between the first emotional configuration and the second emotional configuration.

13. The avatar facial expression generating system according to claim 10, wherein the processor further performs:

obtaining a character of a user, wherein the facial model is an avatar of the user; and determining the third duration according to the character of the user.

14. The avatar facial expression generating system according to claim 10, wherein the user data is voice data, and the processor further performs:

determining whether a key word or a key phrase is detected in the voice data; and determining a triggering condition for the first or second emotional configuration is met in response to the key word or the key phrase being detected.

15. The avatar facial expression generating system according to claim 10, wherein the user data is motion sensing data, and the processor further performs:

determining whether a key motion is detected in the motion sensing data; and determining a triggering condition for the first or second emotional configuration is met in response to the key motion being detected.

16. The avatar facial expression generating system according to claim 10, wherein the user data is image data, and the processor further performs:

determining whether a key motion is detected in the image data; and determining a triggering condition is met in response to the key motion being detected.

17. The avatar facial expression generating system according to claim 10, wherein the processor further performs:

selecting one of the facial expressions from an expression group according to a probability distribution, wherein the expression group comprises a plurality of the facial expressions.

18. The avatar facial expression generating system according to claim 10, wherein the processor further performs:

generating the facial expressions in real-time in response to determining the first emotional configuration and the second emotional configuration.

* * * * *